(No Model.)
A. H. OVERMAN & C. F. HADLEY.
TRICYCLE.
No. 282,358. Patented July 31, 1883.
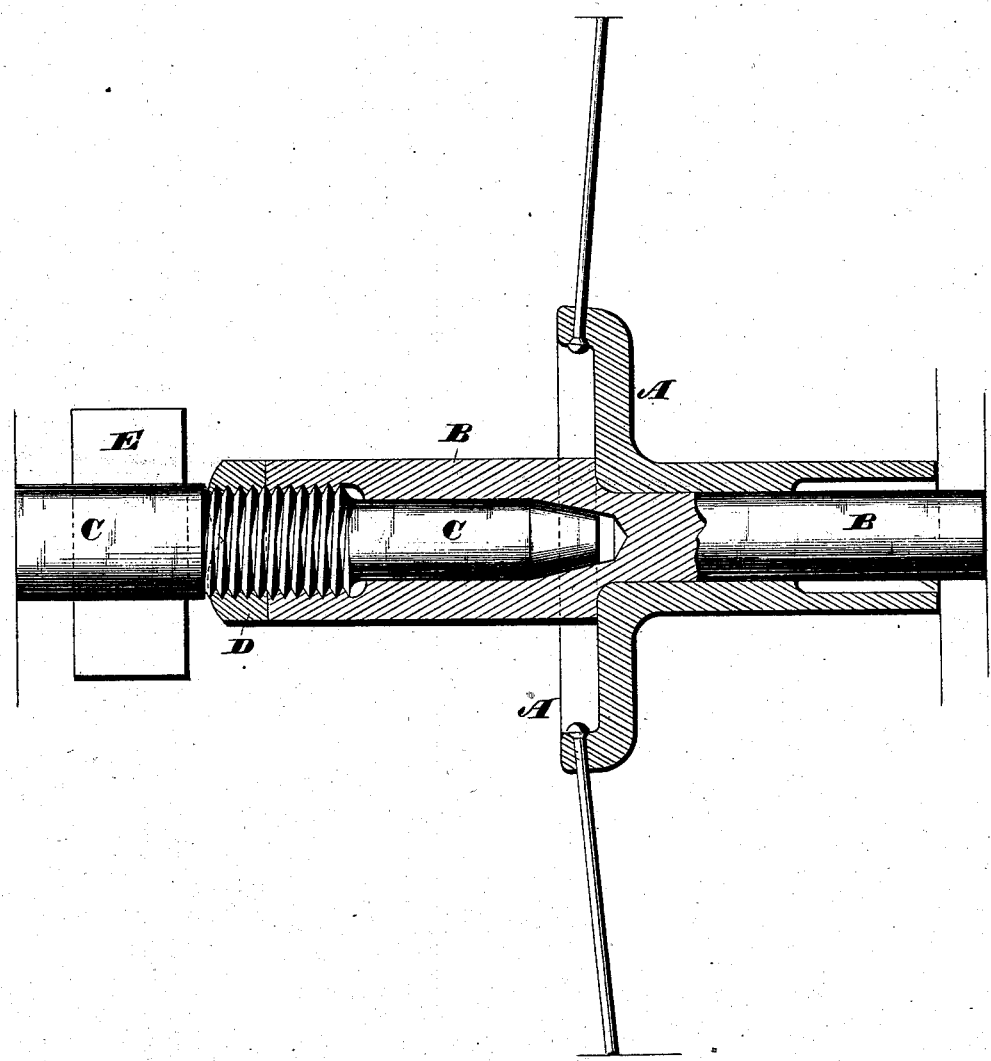
WITNESSES
INVENTORS

United States Patent Office.

ALBERT H. OVERMAN AND CHARLES F. HADLEY, OF CHICOPEE, MASS., ASSIGNORS TO THE OVERMAN WHEEL COMPANY, OF HARTFORD, CONN.

TRICYCLE.

SPECIFICATION forming part of Letters Patent No. 282,358, dated July 31, 1883.

Application filed May 16, 1883. (No model.)

*To all whom it may concern:*

Be it known that we, ALBERT H. OVERMAN and CHARLES F. HADLEY, of Chicopee, in the county of Hampden and State of Massachusetts, have invented certain new and useful Improvements in Tricycles; and we do hereby declare the following to be a full, clear, and exact description of the invention, such as will enable others skilled in the art to which it appertains to make and use the same.

Our invention relates to an improvement in tricycles. Ordinarily machines of this character are made of such width that they are prevented from passing through doorways.

The object of our invention is to overcome this difficulty; and with this end in view it consists in dividing the axle near one wheel into two parts, one section fitting within the other, and which can be detached or coupled with little trouble and in a short space of time.

The accompanying drawing represents our improvement in longitudinal section.

A represents a broken section of the hub, to which is rigidly secured the portion B of the axle. This portion of the axle is provided with a socket which is provided with a female screw-thread. In this socket is screwed the other end of the axle C, the extreme end of which is cone-shaped, the socket being formed in conformity therewith. This allows of the axles to be screwed up tightly and forming a tight joint.

The axle C is preferably provided with a left-hand screw-thread, as in this case the forward motion of the machine tends to tighten the joint. The axle C is also provided with a lock-nut, D, which is adapted to impinge against the portion B, and thus prevent any possibility of the detachment of the parts.

E represents position of the box containing the bearings for the axle. It will now be seen that in order to detach the wheel all that is necessary is to simply loosen the lock-nut D and turn the wheel backward, which detaches the axles. By thus detaching a wheel the machine is materially lessened in width, thus allowing of its passage through any ordinary doorway.

Having fully described our invention, what we claim as new, and desire to secure by Letters Patent, is—

1. The combination, with the wheels, of an axle rigidly secured to one of said wheels and constructed in two parts, the one being provided with a socket having a female thread, and the other being adapted to fit within the socket, and provided with a male thread which meshes with the other thread, and with a locking-nut adapted to lock and unlock the parts, substantially as shown and described.

2. The combination, with the wheels, of the two-part axle, one of said parts being rigidly secured to one of the wheels, and provided with a socket having a cone-shaped termination, and a left-hand female thread, the other part of the axle having a like termination and adapted to fit within the socket, and provided with a left-hand male thread, the said threads meshing together, and a locking-nut adapted to impinge against the socket portion, whereby the parts are locked and unlocked, substantially as shown and described.

In testimony whereof we have signed this specification in the presence of two subscribing witnesses.

ALBERT H. OVERMAN.
CHARLES F. HADLEY.

Witnesses:
ROLAND T. OAKES,
CHAS. L. PEPPER.